Dec. 6, 1960 R. G. YOUNG ET AL 2,963,303
IMPLEMENT TONGUE POSITION CONTROL
Filed Nov. 19, 1958 3 Sheets-Sheet 3
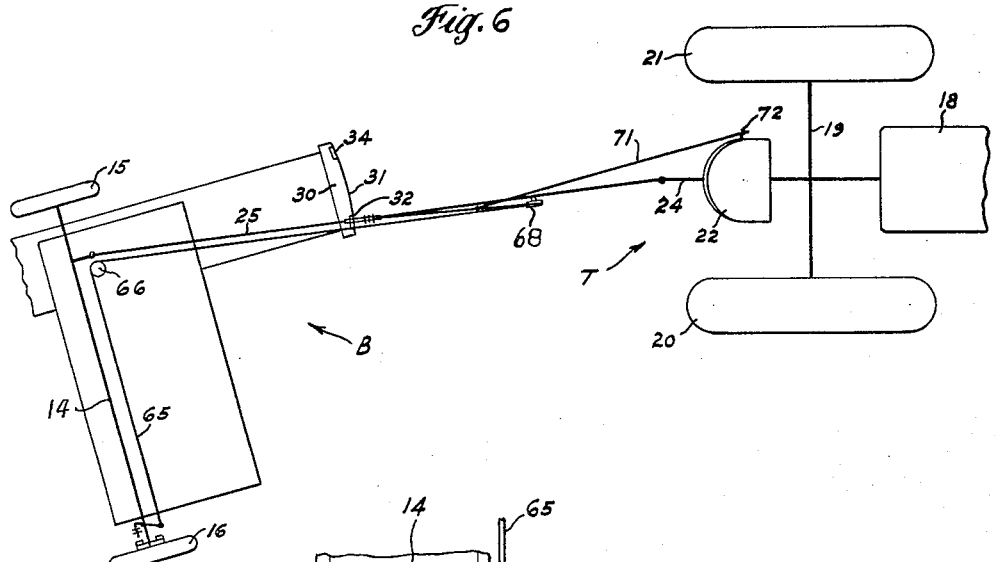
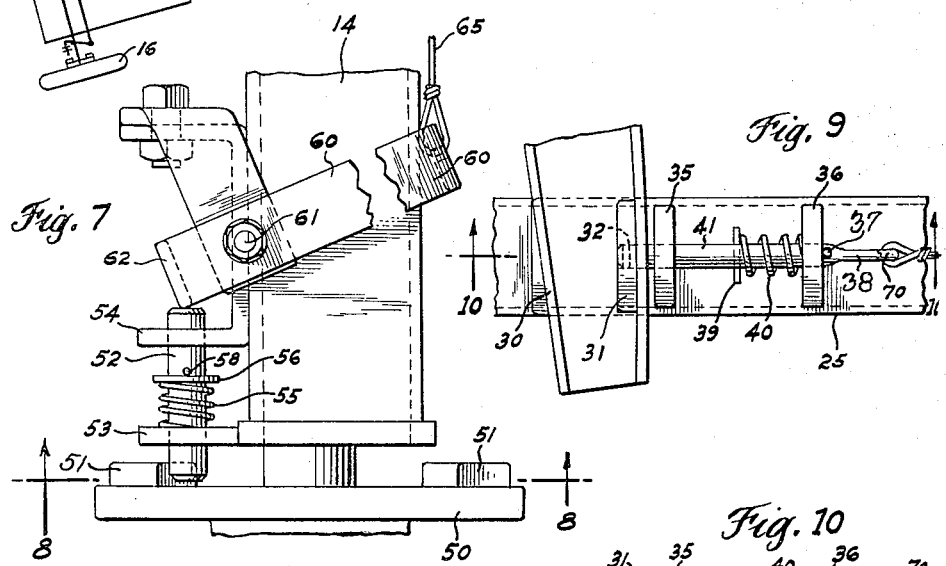
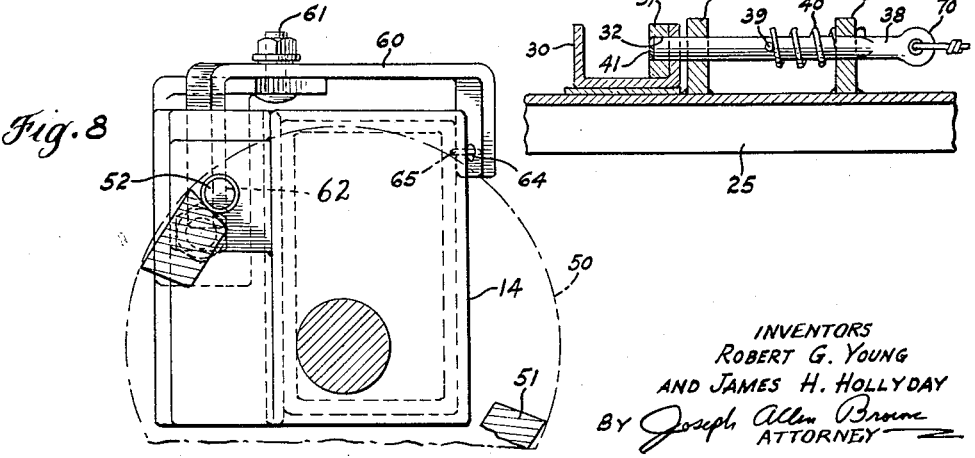
INVENTORS
ROBERT G. YOUNG
AND JAMES H. HOLLYDAY
BY Joseph Allen Browne
ATTORNEY

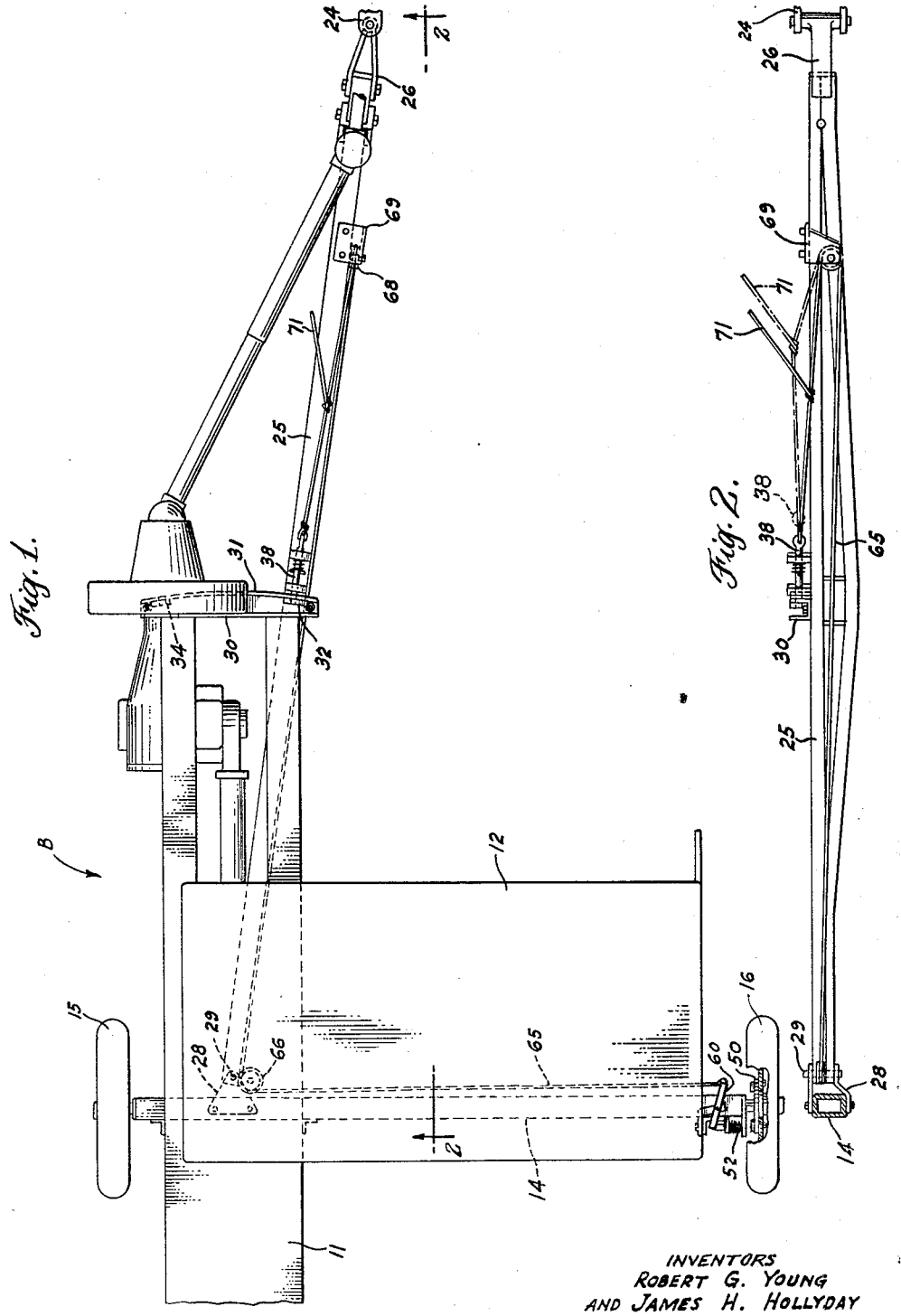

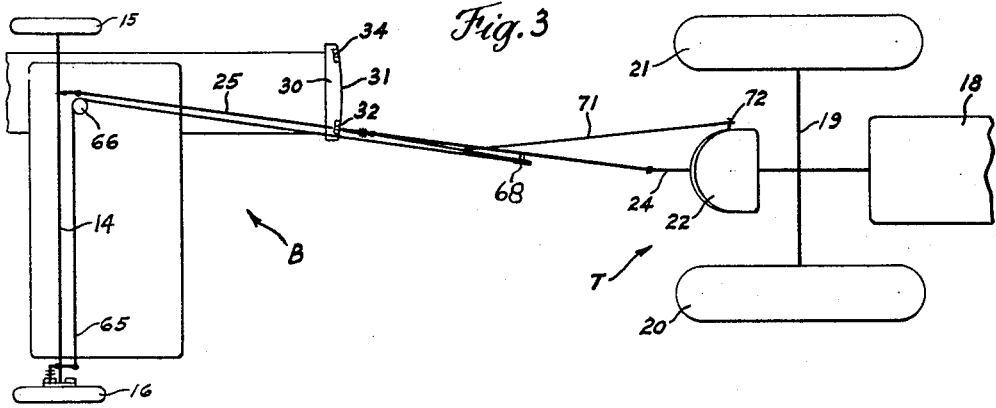
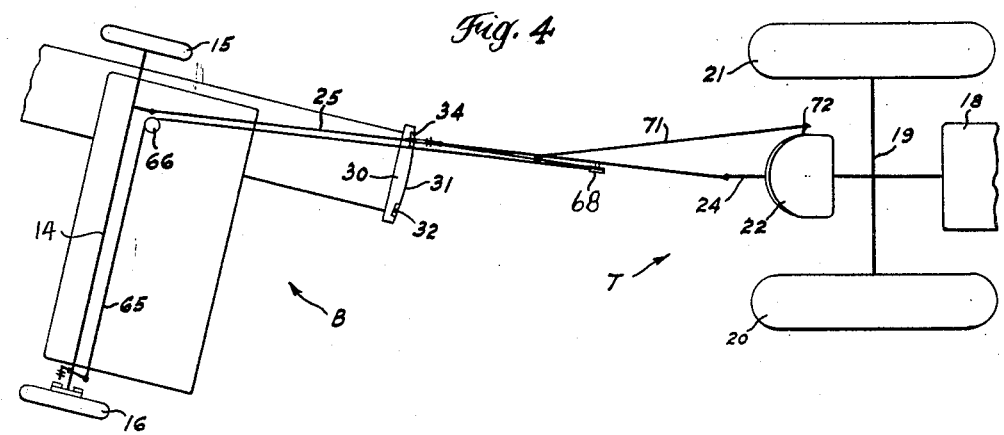
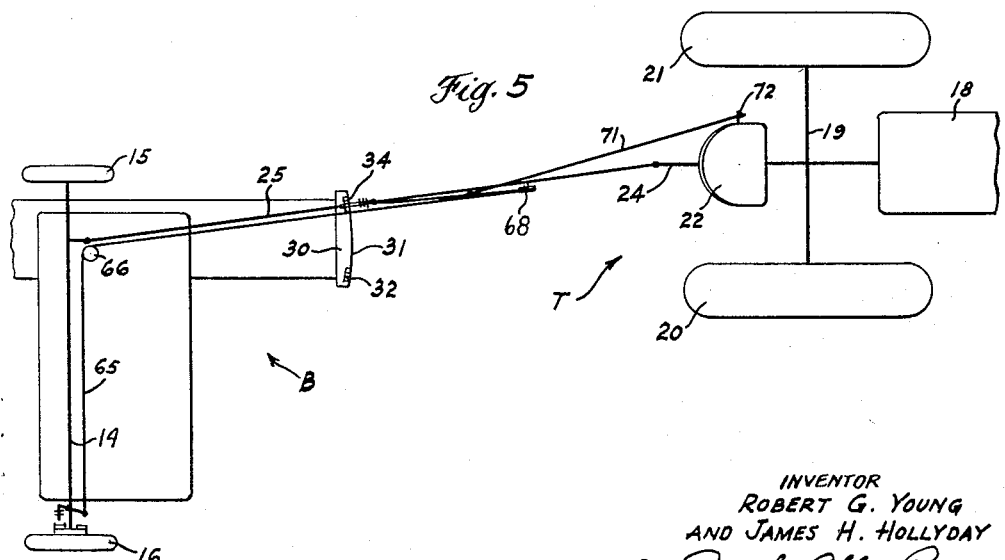

United States Patent Office 2,963,303
Patented Dec. 6, 1960

2,963,303

IMPLEMENT TONGUE POSITION CONTROL

Robert G. Young, Bird in Hand, and James H. Hollyday, New Holland, Pa., assignors to Sperry Rand Corporation, New Holland, Pa., a corporation of Delaware Filed Nov. 19, 1958, Ser. No. 774,867

9 Claims. (Cl. 280—462)

This invention relates generally to the towing of vehicles wherein a tongue is employed. More specifically, the invention relates to a means whereby a laterally shiftable tongue of a towed vehicle can be quickly and easily shifted laterally between operative positions.

The environment of this invention can be understood by considering a conventional hay baler. Such baler comprises generally a fore-and-aft extending bale case having an opening in a vertical side wall thereof to receive crop material. A pickup extends transversely relative to the direction of travel of the baler. Such pickup is adapted to elevate crop material from a windrow and convey it rearwardly to a feed mechanism. The feed mechanism then takes the material and conveys it into the bale case through the side wall opening. The material deposited in the bale case is engaged by a reciprocating plunger which forms the crop material into bales. Such bales are tied upon completion and subsequently discharged onto the ground or into a trailing wagon.

A baler is provided with a forwardly extending tongue whereby it can be connected to a tractor or the like. In order that the tractor will not run over the windrowed crop material when a baling operation is taking place, it is conventional to have the hay baler laterally offset relative to the tractor while baling. Such offsetting is permissible when operating in an open field. However, if the baler is to be towed on a highway, the baler may not be laterally offset because the combined tractor and baler will take up too much space on the road. Therefore, it is necessary that the baler trail directly behind the tractor. For this reason, it is common to provide hay balers with a laterally shiftable tongue. When the baler is towed on the highway, the tongue is disposed in an inboard position and latched there. When the baler reaches the field where it is to be used, the tongue is shifted to an outboard position whereby when the baler is operated it is displaced laterally relative to the tractor towing it.

Heretofore, considerable annoyance and difficulty has been experienced and much time lost in shifting a tongue from an inboard to an outboard position, or vice versa. It has been necessary for the tractor operator to maneuver the tractor so that the tongue will be swung to desired position where it can be locked into place. Often, more space is required for this maneuvering than is available. In such case, manual assistance is often required to shift the baler relative to the tractor to obtain a proper positioning of the tongue.

One object of this invention is to provide a means whereby a tongue may be shifted from an inboard to an outboard position, or vice versa, in a matter of seconds and without the tractor operator having to leave the tractor.

Another object of this invention is to provide a means whereby a tongue may be laterally shifted merely by a forward or rearward movement of the tractor.

Another object of this invention is to provide a means whereby an implement tongue can be laterally shifted where the space available for maneuvering is limited.

A still further object of this invention is to provide a simple inexpensive structure which will accomplish the foregoing objects without adding much in the way of additional cost to the implement.

Other objects of this invention will be apparent hereinafter from the specification and from the recital in the appended claims.

In the drawings:

Fig. 1 is a plan view showing generally diagrammatically, a hay baler having a laterally swingable tongue, there being provided means constructed according to this invention whereby the tongue may be quickly and easily shifted;

Fig. 2 is a fragmentary section taken on the line 2—2 of Fig. 1 and looking in the direction of the arrows;

Figs. 3–5 are generally diagrammatic plan views showing the operation of the structure of this invention to achieve the shifting of a tongue from an inboard to an outboard position;

Fig. 6 is a view similar to Figs. 3–5 and showing diagrammatically the operation of the device of this invention for shifting a tongue from an outboard position to an inboard position;

Fig. 7 is an enlarged plan view of the mechanism employed for braking one of the wheels of the baler;

Fig. 8 is a section taken on the line 8—8 of Fig. 7 and looking in the direction of the arrows;

Fig. 9 is an enlarged plan view showing the mechanism for latching the tongue in adjusted position; and Fig. 10 is a section taken on the line 10—10 of Fig. 9 and looking in the direction of the arrows.

Referring now to the drawings by numerals of reference and particularly Figs. 1, 2, and 7–10, B denotes generally a hay baler having a fore-and-aft extending bale case 11 and a transversely extending pickup and feed mechanism 12. The baler is supported on a transverse frame member 14 supported at its ends by a pair of laterally spaced ground wheels 15 and 16.

The baler is adapted to be towed by a tractor T having a body 18, a rear axle 19 and traction wheels 20 and 21. The tractor has an operator's seat shown at 22. Beneath seat 22 and extending rearwardly is a drawbar 24. Hay baler B is adapted to be connected to the tractor by means of a forwardly extending tongue 25 having a hitch member 26 at its forward end. The rearward end of tongue 25 is pivotally connected to a bracket 28 affixed to cross frame member 14. The tongue is swingable laterally about the vertical axis of a pin 29. Mounted on the forward end of bale case 11 is a stop block 30 having an arcuate front face 31 concentric with the axis of pin 29. Front face 31 is provided with a hole 32 at its inboard end, and a hole 34 at its outboard end. Mounted on tongue 25 and projecting upwardly therefrom are support members 35 and 36 having registering holes through which a latch pin 38 is projectable. Latch pin 38 carries a transverse pin 39. Between pin 39 and support 36 is a spring 40 which constantly biases the latch pin toward the stop block 30. A lug 37 limits movement of the latch pin toward the block. The latch pin 38 has a rearward end 41 adapted ot project through one of the holes, 32 or 34, in the stop block 30. When pin 38 is projected through the hole 32, the tongue 25 is locked in inboard position as shown in Figs. 1-3 and 9. When the latch pin 38 is projected through the hole 34 in the stop block. the tongue 25 is locked in outboard position, Figs. 4 and 5.

Wheel 16 is provided with a brake as shown best in Figs. 1, 7 and 8. Such brake comprises a plate 50 connected to wheel 16 and disposed concentrically therewith.

Plate 50 has inwardly projecting lugs 51, two lugs being shown. However, a different number could be employed. Engageable with lugs 51 is a brake pin 52 supported for movement on brackets 53 and 54 carried on frame member 14. Pin 52 is surrounded by a spring 55 which engages a washer 56 held against movement on the pin by a retainer 58. The spring 55 serves to constantly bias pin 52 away from plate 50 and the lugs 51 thereon.

Mounted on cross frame 14 adjacent brake pin 52 is a lever arm 60 pivoted on a pin 61. Lever 60 has an end 62 which engages one end of the brake pin 52. The opposite end of lever 60 has a hole 64 to which one end of a first cable 65 is attached. Cable 65 extends from lever 60 transversely across the hay baler to an idler 66 carried on the baler. The cable extends around the idler and then forwardly to a second idler 68 supported adjacent the forward end of tongue 25 on a bracket 69. Cable 65 extends around the idler 68 and then to the latch pin 38 to which it is connected, an eye 70 being provided on the latch pin for this purpose. At a point between the latch pin 38 and bracket 69 a second cable 71 is connected to the first cable. Cable 71 extends forwardly to a fastener 72 carried on the tractor seat 22.

*Operation*

Assume that the various operating parts are disposed as shown in Fig. 3, with the tongue 25 in inboard position, and with the latch pin 38 projected through the hole 32 in the stop block 30. There is no tension on the second cable 71 or the first cable 65. Thus, the spring 55 is able to force the brake pin 52 out of engagement with brake plate 50 as indicated in Fig. 1. With the tongue so disposed, and locked in position, and with the brake for the wheel 16 released, the baler is in condition to be towed on a highway or to a field where it is to be used. When the operator reaches the field and a baling operation is to commence, the operator reaches down and grasps the cable 71 and pulls it. The pulling of cable 71 is transmitted to the cable 65 whereupon two things happen. First, the latch pin 38 is retracted against the resistance of the spring 40 and the tongue is released from the stock block 30. Secondly, and at the same time, lever 60 is pivoted about pin 61 and the end 62 forces the brake pin 52 to shift toward stop plate 50, Figs. 7 and 3. While holding the cable 71 taut, the operator pulls the tractor 13 forwardly. Since the wheel 16 is braked, the baler is caused to pivot about such wheel, whereupon the tongue is shifted to an outboard position, Fig. 4. When the tongue reaches an outboard position, cable 71 is released whereupon the latch pin 38 will drop into the outboard hole 34 under the action of spring 40 and the brake pin 52 will be shifted out of engagement with the brake plate 50 by the spring 55. With the tongue now locked in outboard position and the brake to the wheel 16 released (Fig. 4), the operator merely pulls the tractor further ahead whereupon the baler assumes its proper operative position relative to the tractor, Fig. 5. A baling operation may now be commenced.

When the operator finishes baling, and he wishes to transport the baler to a place of storage or out on the highway, he will again pull on the cable 71. Wheel 16 will be braked and the latch pin 38 will be released. Then, the operator of the tractor will back up whereupon the baler will pivot about the wheel 16 as shown in Fig. 6 causing the tongue 25 to be swung relative to the stop block 30 and to an inboard position. When the tongue reaches an inboard position, the cable 71 is released whereupon the latch pin will drop into the inboard hole 32 and the brake for wheel 16 will be released. The operator then drives off whereupon the baler assumes the position as shown in Fig. 3.

With this structure, the shifting of the tongue 25 from an inboard to an outboard position is quickly and easily accomplished. The operator of the tractor never has to leave the seat 22. Since the shifting of the tongue is achieved by braking one wheel, the tractor operator merely has to drive either forwardly or in reverse to achieve a desired shifting. No arcuate maneuvering of the tractor is required.

Since the brake employed on the wheel 16 has only two lugs 51, as shown, there will be some rotation of the wheel 16 before the brake pin 52 comes into engagement with a lug to stop the wheel after pin 52 has been shifted. However, this is of little consequence. A greater number of lugs can be provided if desired. Also, to conserve costs, one lug would suffice if desired. The fact that the wheel 16 may rotate somewhat before it is brought to a stop is of no particular consequence since there is generally plenty of room for fore-and-aft movement.

The above structure is simple and inexpensive. Nevertheless, it overcomes a problem which was irksome heretofore. Much time is saved in achieving a desired position of the tongue in an inboard transport position or an outboard operative position.

While this invention has been described in connection with a hay baler, it could be used with many other farm implements, such as forage harvesters. As with a hay baler, a forage harvester has a tongue extending along one side of the machine and it is necessary that the drawbar be disposed in one position when the forage harvester is towed on a tongue and in another position when the forage harvester is used in the field. Moreover, while this invention has been described in connection with a particular embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains, and as fall within the scope of the invention or the limits of the appended claims.

Having thus described our invention, what we claim is:

1. In combination, an implement supported on a pair of laterally spaced ground wheels, a forwardly extending tongue attachable to a vehicle for towing the implement, means connecting a rearward end of said tongue to said implement adjacent one of said pair of wheels for pivotal movement about a vertical axis, said tongue being laterally swingable about said axis from a first position to a second position, means for releasably latching said tongue to said implement in either of said positions, a brake for the other of said pair of wheels, and control means extending between said vehicle and said implement for operating both said latching means and said brake.

2. The combination as recited in claim 1 wherein said latching means comprises a stop block fixedly connected to said implement and a pin carried on said tongue for movement into and out of engagement with said stop block to apply and release said latching means, respectively.

3. The combination as recited in claim 1 wherein said brake comprises a plate connected to said other wheel and a pin carried on said implement for movement into and out of engagement with said plate to apply and release the brake, respectively.

4. In combination, an implement supported on a pair of laterally spaced ground wheels, a forwardly extending tongue attachable to a vehicle for towing the implement, means connecting a rearward end of said tongue to said implement adjacent one of said pair of wheels for pivotal movement about a vertical axis, said tongue being laterally swingable about said axis from a first position to a second position, means for releasably latching said tongue to said implement body in either of said positions, said latching means comprising a stop block fixedly connected to said implement and a pin carried on said drawbar for movement into and out of engagement with the stop block to apply and release said latching means, respectively, a brake for the other of said pair of wheels, said brake comprising a plate connected to said other wheel and a pin on said implement movable into and out of engagement with said plate to apply and release the brake, respectively, and control means extending between said vehicle and said implement and connected to said pins for moving the pins and thereby operating said latching means and said brake.

5. The combination as recited in claim 4 wherein a spring is interposed between said implement and said brake pin to normally hold the brake pin out of engagement with said plate.

6. The combination as recited in claim 5 wherein a spring is interposed between said tongue and the pin of said latching means to bias said pin toward engagement with said stop block.

7. The combination as recited in claim 6 wherein a lever is pivotally mounted on said implement, said lever having one end engaging said brake pin and an opposite end connected to said control means.

8. The combination as recited in claim 7 wherein said control means comprises a first cable having one end connected to the pin of said latching means and an opposite end connected to the opposite end of said lever, and a second cable connected between said first cable and the vehicle whereby the vehicle operator can reach the second cable, said second cable when pulled, pulling said first cable and thereby moving said pin of said latching means away from said stop block and pivoting said lever to force said brake pin into engagement with the brake plate.

9. In combination, an implement supported on a pair of laterally spaced ground wheels, a forwardly extending tongue attachable to a vehicle for towing the implement, means connecting a rear portion of said tongue to said implement for pivotal movement about a vertical axis, said tongue being connected to said implement between said wheels and being laterally swingable about said vertical axis between a first position and a second position, means for releasably latching said tongue against lateral swinging relative to said implement in either of said positions, a brake for one of said pair of wheels, and control means extending between said vehicle and said implement for applying said brake and releasing said latching means whereby a force applied axially along said tongue will pivot the implement about the braked wheel and change the position of the implement relative to the tongue.

References Cited in the file of this patent

UNITED STATES PATENTS

| | | |
|---|---|---|
| 405,041 | Levy | June 11, 1889 |
| 815,880 | Tillman | Mar. 20, 1906 |
| 2,429,492 | Scranton | Oct. 21, 1947 |
| 2,430,143 | Rutter | Nov. 4, 1947 |
| 2,474,445 | Vutz | June 28, 1949 |
| 2,495,818 | Oerman | Jan. 31, 1950 |